(12) United States Patent
Nilsen et al.

(10) Patent No.: US 7,163,624 B2
(45) Date of Patent: Jan. 16, 2007

(54) ELECTROSTATIC SEPARATOR

(75) Inventors: Pål Jahre Nilsen, Boedalen (NO); Wojciech Piasecki, Cracow (PL)

(73) Assignee: Vetco Aibel AS, Billingstad (NO)

( * ) Notice: Subject to any disclaimer, the term of this patent is extended or adjusted under 35 U.S.C. 154(b) by 209 days.

(21) Appl. No.: 10/498,561

(22) PCT Filed: Dec. 13, 2002

(86) PCT No.: PCT/IB02/05358

§ 371 (c)(1), (2), (4) Date: Jun. 14, 2004

(87) PCT Pub. No.: WO03/049834

PCT Pub. Date: Jun. 19, 2003

(65) Prior Publication Data
US 2005/0036924 A1 Feb. 17, 2005

(30) Foreign Application Priority Data
Dec. 13, 2001 (PL) ...................................... 351182

(51) Int. Cl.
*B01D 17/06* (2006.01)

(52) U.S. Cl. ...................... 210/243; 204/666; 204/672; 204/673; 210/532.1; 210/538; 210/540; 210/748

(58) Field of Classification Search ................ 210/748, 210/532.1, 538, 540, 243; 204/666, 672, 204/673; 96/69, 86–88
See application file for complete search history.

(56) References Cited

U.S. PATENT DOCUMENTS

| 2,976,228 A | * | 3/1961 | Waterman et al. .......... 204/673 |
| 3,672,127 A | * | 6/1972 | Mayse et al. ............... 204/662 |
| 3,674,677 A |   | 7/1972 | Roberts ..................... 204/670 |
| 3,679,556 A | * | 7/1972 | Doevenspeck ............... 204/269 |
| 3,772,180 A | * | 11/1973 | Prestridge ................... 204/663 |
| 4,049,535 A | * | 9/1977 | Winslow, Jr. ............... 204/663 |
| 4,200,516 A |   | 4/1980 | Pope .......................... 204/671 |
| 4,226,689 A | * | 10/1980 | Mayse et al. ............... 204/563 |
| 4,308,127 A |   | 12/1981 | Prestridge et al. .......... 204/666 |
| 4,367,132 A | * | 1/1983 | Bell et al. ................... 204/518 |
| 4,702,815 A |   | 10/1987 | Prestridge et al. .......... 204/673 |

(Continued)

FOREIGN PATENT DOCUMENTS

JP            5932960 A     2/1984

(Continued)

Primary Examiner—Richard L. Chiesa
(74) Attorney, Agent, or Firm—Venable LLP; Eric J Franklin

(57) ABSTRACT

An electrostatic separator intended for separation of liquid phase systems, made up of mixtures of liquids of various electrical permittivity. In particular, the separator is intended for separation of an oil-and-water emulsion. The electrostatic separator contains a vessel, inside which there is suspended a system of electrodes energized from an external voltage source. The electrode system comprises at least one pair of conducting plates (8), which is attached to a supporting frame (7) and electrically connected with the high voltage winding of a feeding transformer (9), which is placed in the supporting frame (7). The supporting frame (7) is preferably a casting of an insulating material. The conducting plates (8) of the electrode system are preferably connected to the winding of the feeding transformer (9) through a capacitive electrical connection.

21 Claims, 5 Drawing Sheets

U.S. PATENT DOCUMENTS

| | | | |
|---|---|---|---|
| 5,891,315 A * | 4/1999 | Nash | 204/664 |
| 6,139,710 A * | 10/2000 | Powell | 204/673 |
| 6,171,465 B1 * | 1/2001 | Compton | 204/570 |
| 6,932,905 B1 * | 8/2005 | Briltz et al. | 210/199 |
| 2002/0050479 A1 * | 5/2002 | Scott | 210/748 |

FOREIGN PATENT DOCUMENTS

| | | | |
|---|---|---|---|
| JP | 3-296457 | * 12/1991 | 204/672 |

* cited by examiner

Detail "b"

ELECTROSTATIC SEPARATOR

CROSS-REFERENCE TO RELATED APPLICATIONS

This application claims priority to Polish patent application 351182 filed 13 Dec. 2001 and is the national phase under 35 U.S.C. §371 of PCT/IB02/05358.

1. Technical Field

The present invention relates to an electrostatic separator intended for separation of liquid phase systems, which are mixtures of liquids of different electrical permittivity. In particular, the electrostatic separator contains a vessel, inside which there is suspended a system or set of electrodes energised by means of an external voltage source.

Since the invention is particularly applicable to electrostatic separators for separation of water from oil in oil-and-water emulsions, it will be described with reference to such an application. However, it should be understood that the invention is applicable to all kinds of electrostatic separation applications intended for separation of liquid phase systems.

BACKGROUND OF THE INVENTION

Electrostatic separation of liquid phase systems is commonly used in the chemical industry, especially in petroleum industry. Such separation consists in the use of the forces of an electric field generated by means of electrodes immersed in the liquid environment subjected to the separation process. There are known solutions wherein the electrodes are energised with both DC and AC current.

The commonly known separators are vessels of various shapes, which are filled with liquid subjected to the separation process. When connected to a voltage source, the electrodes, which are immersed in the liquid, cause the formation of an electric field. Phase separation takes place as a result of many processes connected with the presence of the electric field, such as polarisation and dipole interaction or electrophoresis. For a water-in-oil emulsion, wherein the dispersed phase is water, fine droplets of the dispersed phase coalesce to form bigger droplets, which fall down to the tank bottom due to gravity. The separated phases of the mixture are removed from the tank through outlets suitably located in the vessel. Separator vessels can be divided into a number of chambers, in which different separation techniques are applied depending on the percentage composition of the mixture to be separated into its components or phases. Mixture separation employs electrodes made of conducting elements, to which an external source of high voltage is connected through a transformer located outside the vessel. If the electrodes are supplied with direct current, the power supply system contains a rectifier. Due to the danger of arcing between the electrodes, the power supply units are often provided with protecting systems, which restrict the current.

2. Prior Art

For example, from U.S. Pat. No. 3,674,677 there is known a device intended for water-and-oil emulsion separation. This device contains a cylindrical, horizontally situated vessel, having an emulsion inlet opening located at a certain level at one end of the vessel, an oil drain located at the other end of the vessel, and a water drain located in the vessel bottom. Inside the vessel there is placed vertically one set of electrodes supplied with high voltage and another set of electrodes grounded inside the vessel. The electrodes in both sets have the form of conducting plates, concentrically curved with respect to the longitudinal axis of the vessel. The high voltage electrodes are placed between the earthed electrodes and the earthed internal wall of the vessel. The vertical high voltage electrode plates are attached to a horizontal plate, which is suspended from the walls of the upper part of the vessel by means of many insulated hangers, and which is electrically coupled, through an insulated feeder, to an external source of high voltage. The vertical plates of the earthed electrodes are attached to internal metal parts of the vessel.

From U.S. Pat. No. 4,702,815 there is known a device for desalting and dehydrating of oil by means of an electrostatic separation process. The device contains a vessel provided with adequate inlet openings for oil and diluting water, and outlet openings for the separated products. An electrode system for the generation of an electric field, suspended vertically in the upper part of the vessel and attached to said vessel by insulated hangers, is composed of a number of composite plates placed parallel to each other, and these plates consist of a conducting part that is located centrally in the framing of another part, which does not conduct electric current. Voltage is supplied to the conducting part from an external source of alternating current, whereby the high voltage winding of a transformer located outside the vessel is connected to the electrodes in such a manner that adjacent plates are supplied with opposite charges, or that supply voltage is fed to alternate plates, and each non-supplied plate is earthed.

The presented solutions of prior art demonstrate basically two types of electrostatic separation devices. One type, presented in U.S. Pat. No. 3,674,677, represents a separator with an electrode arrangement, which is usually supplied by means of a DC source, and another type presented in U.S. Pat. No. 4,702,815 represents a separator with a system of insulated electrodes, normally supplied with alternating current. There are further known solutions, which have both types of electrode arrangements placed in one vessel, e.g. the solution known from U.S. Pat. No. 4,308,127.

In all above mentioned solutions the source of high voltage supply is located outside the electrostatic separator vessel, and the elements used to attach the electrode system inside the vessel require the use of special insulated connections between the high voltage winding of the feeding transformer and individual electrodes, placed in the separator vessel wall. Thus, prior art electrostatic separators show a complicated and voluminous construction, and are also difficult to maintain.

THE OBJECT OF THE INVENTION

It is an object of the invention to present an electrostatic separator containing a vessel, which separator has a construction that is considerably simpler and more compact compared to prior art separators. The electrostatic separator shall also be operatively reliable and promote an easy maintenance thereof.

BRIEF DESCRIPTION OF THE INVENTION

The object of the invention is achieved by means of an electrostatic separator containing a vessel, such as a gravity separator tank, inside which there is suspended a system or set of electrodes energized by means of an external voltage source, characterised in that the electrode system comprises at least one pair of conducting plates, which is attached to a supporting frame arranged inside the vessel, and electrically connected to a high voltage winding of a feeding transformer, which is located in the supporting frame.

Preferably, the supporting frame is in the form of a casting made of an insulating material.

Preferably, the supporting frame casting is made of epoxy resin.

Preferably, the conducting plates of the electrode system are connected to the feeding transformer winding through a capacitive electrical connection.

Preferably, the capacitive electrical connection has a form of a conducting element insulated inside the supporting frame, and the end of the conducting plate of the electrode system is placed near the conducting element.

Preferably, the conducting plates of the electrode system are coated with a layer of an insulating material.

Preferably, the operating frequency of the feeding transformer is higher than 50 Hz.

The advantage of the inventive separator is the possibility to construct a device in which all high-voltage elements are completely insulated inside the supporting frame, and the power supply from the external power supply source, delivered to the feeding transformer through the separator vessel wall is low voltage supply. Placement of the feeding transformer in the supporting frame, especially a frame made of an insulating material, and the location of the electrode system in this frame, considerably simply the construction of the separator.

Further features and advantages of the present invention are presented in the following detailed description of the inventive electrostatic separator.

BRIEF DESCRIPTION OF THE DRAWINGS

Below, preferred embodiments of the electrostatic separator according to the present invention will be described more in detail with reference to the appended drawings. in which.

DETAILED DESCRIPTION OF THE INVENTION

Figure 1:
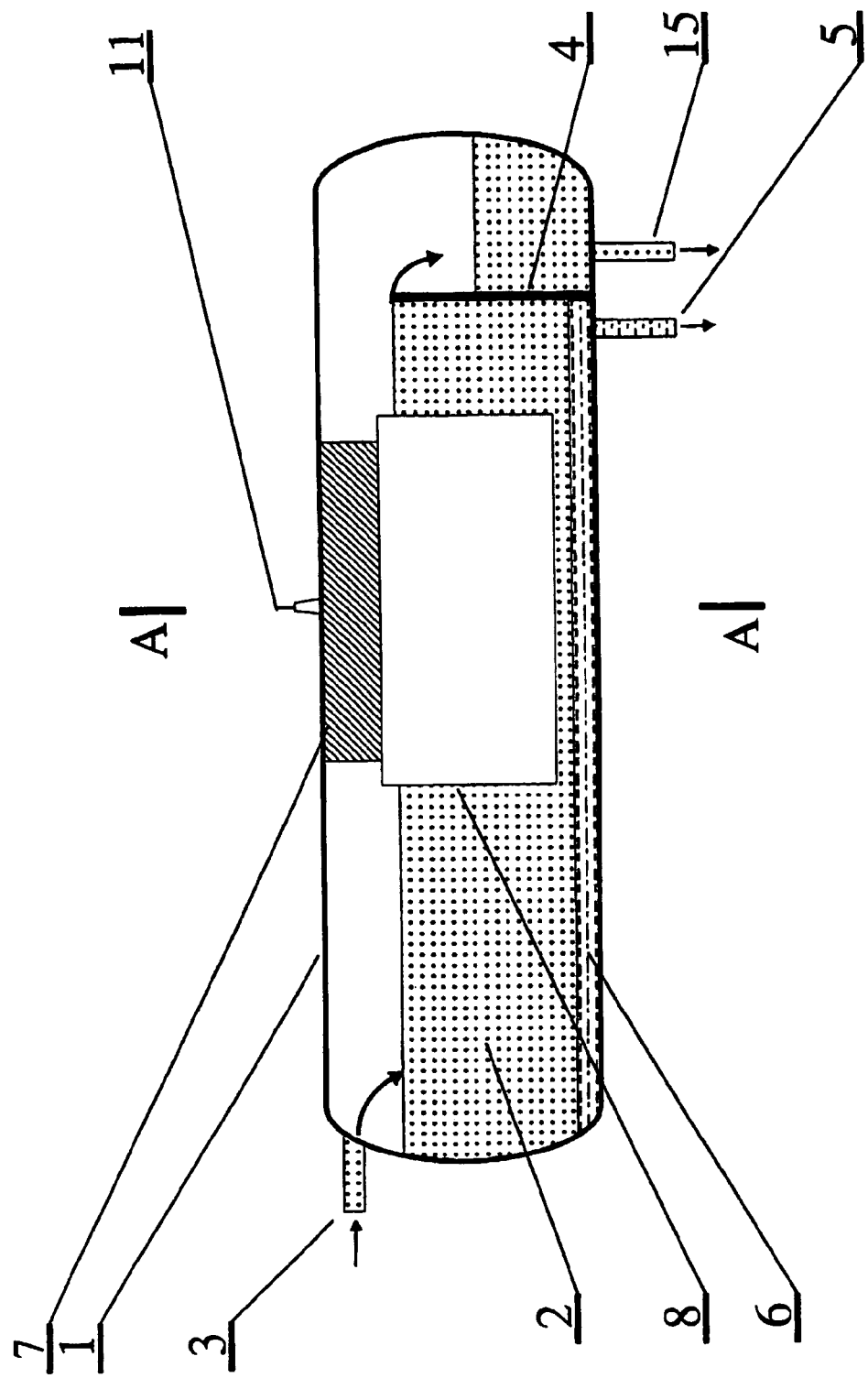
FIG. 1 schematically shows a longitudinal cross sectional view of a first embodiment of the inventive separator.

FIG. 1 is a schematic view showing an electrostatic separator according to one embodiment of the invention. The electrostatic separator contains a vessel, which is a metallic, cylindrical, horizontally oriented drum, filled with a water-and-oil emulsion 2. Filling of the vessel 1 is made through an inlet 3. located in the upper part of the vessel. Normally, the separator vessel is divided by means of suitable baffles into several chambers or compartments. in which the successive separation stages are realised. In the embodiment example in the drawing one baffle 4 is shown, and the vessel is divided into two compartments. In the first compartment, containing the inlet 3 for emulsion 2 and a water drain 5, which is used to remove the water phase 6 from the vessel 1, there is attached a supporting frame 7 to the Inner upper wall of the vessel 1 by means of a support structure not shown in the drawing. In the second compartment of the vessel 19 located behind the baffle 4 (as seen in the main flow direction through the vessel 1), there is a drain opening 15 for separated pure oil. To the supporting frame 7 there are attached conducting plates of an electrode system, which are connected to an outer voltage source located outside the vessel 1. The supporting frame 7 is a casting made of insulating material, preferably epoxy resin, with a transformer 9 arranged on the inside thereof The transformer 9 is completely insulated on the outside and its ends of the low voltage winding 10 are leading out of the frame 7 and connected to a low voltage terminal 11 arranged at the outside of the vessel 1. The conducting plates or electrodes 8 are suspended generally vertically from the supporting frame 7 and arranged in parallel with each other at fixed distances so as to substantially cover the cross sectional area of the vessel, especially the cross sectional area of the water-and-oil emulsion. The conducting plates further have a certain extension in the length direction of the vessel depending on for example the specific separation condition.

Figure 2:
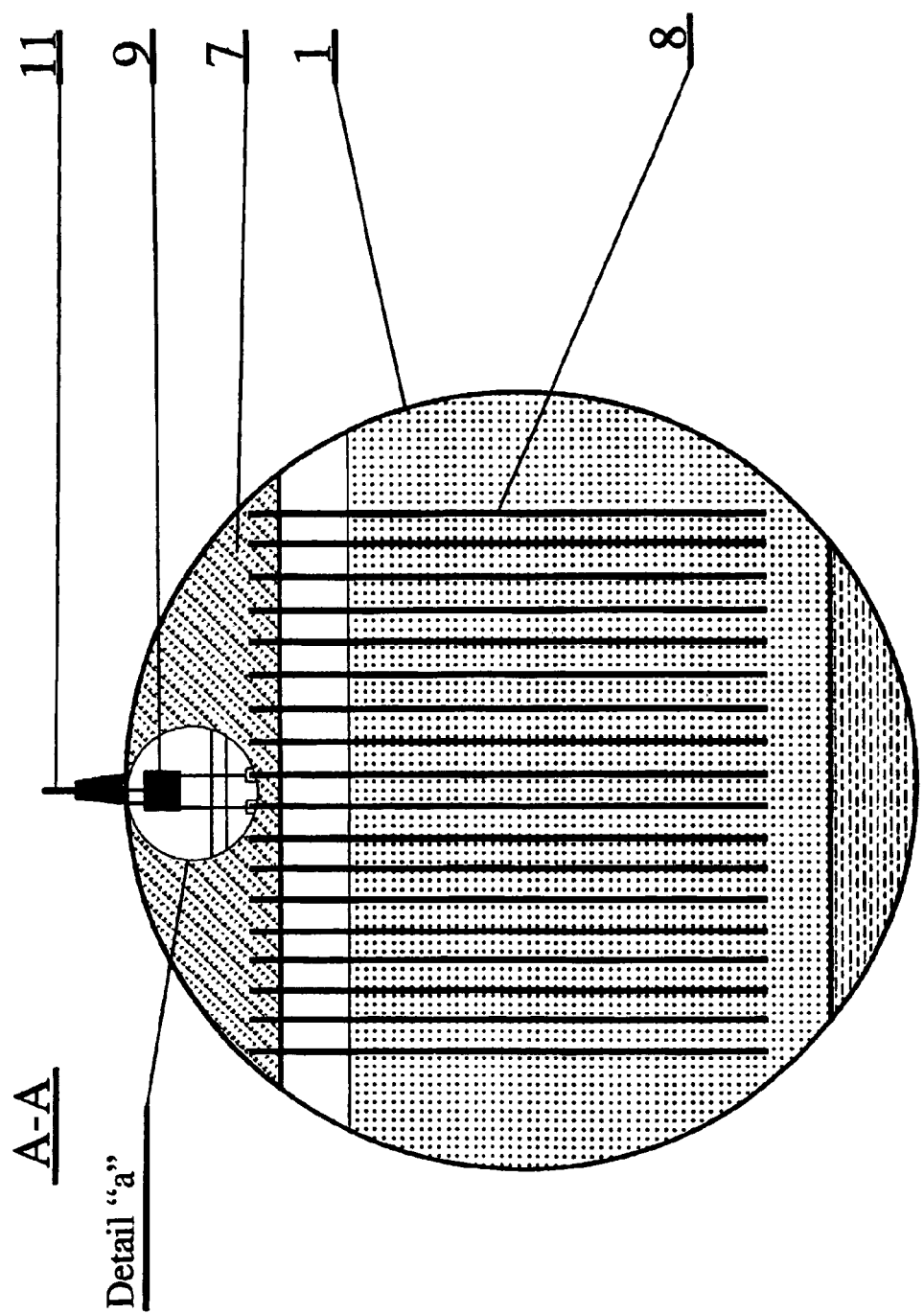
FIG. 2 shows a cross-section according to A—A in FIG. 1, FIG. 3 schematically shows a developed detail "a" in FIG. 2, FIG. 4 schematically shows a cross-section of a second embodiment of the inventive separator, and FIG. 5 schematically shows a developed detail "b" in FIG. 4.
Figure 3:
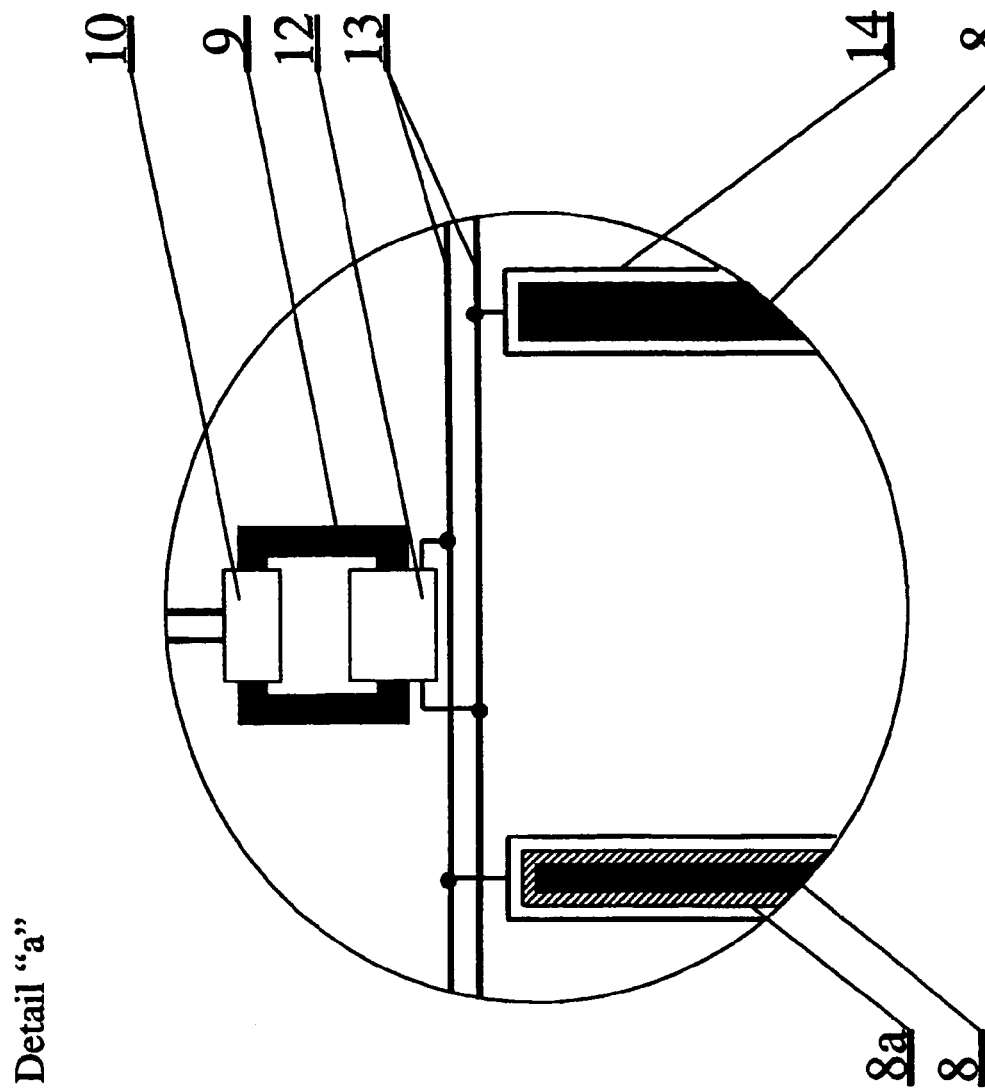

As can be seen in more detail in FIGS. 2 and 3, according to a first embodiment of the invention, one end of the low voltage winding of the transformer 9 is connected to an external low voltage terminal 11, while the other end is connected with the vessel wall. The ends of the high voltage winding 12 of the transformer 9 are connected via voltage busbars 13, which are embedded in the material of the frame 7, with conducting elements 14 made of flat channel bars, by electric connection of the channel back with the appropriate bus. In each conducting element 14, which is located in the insulating material of the frame 7, in the gap formed between the flanges of the channel bar and in a groove located in the frame 7, directly under the gap of the channel, there is placed a conducting plate 8 of the electrode system. Between the outer surface of this plate and the inner surface of the conducting element 14 there is an insulating layer of the frame 7, whose thickness corresponds to the difference in the transverse dimensions between the width of the groove made in the frame 7, corresponding to the conducting plate 8 thickness, and the distance between the flanges of the channel section in the conducting element 14. In the electrode system, each of the electrodes is made of a conducting material, in the form of an uninsulated conducting plate 8, or this plate can be continuously coated with an insulating layer 8a. The electrical connection between the conducting element 14 and the conducting plate 8, or a conducting plate with the insulating layer 8a, is in both cases a capacitive electrical connection. The ends of the high voltage winding 12 are connected with the plates of the electrode system in such a way that the adjacent plates are supplied with high voltage of opposite sign. which is shown in FIG. 3. In the device operating conditions, any number of conducting plates 8 can be made as conducting plates with the insulating layer 8a. The conducting plates 8 and the conducting plates with the insulating layer 8a can be installed in the same system of electrodes fixed in the frame 7. The selection of the type of electrodes depends on the manner of power supply and on the supply voltage level. The outside shape of the supporting frame 7 is adjusted to suit the shape of the separator vessel 1.

Figure 4:
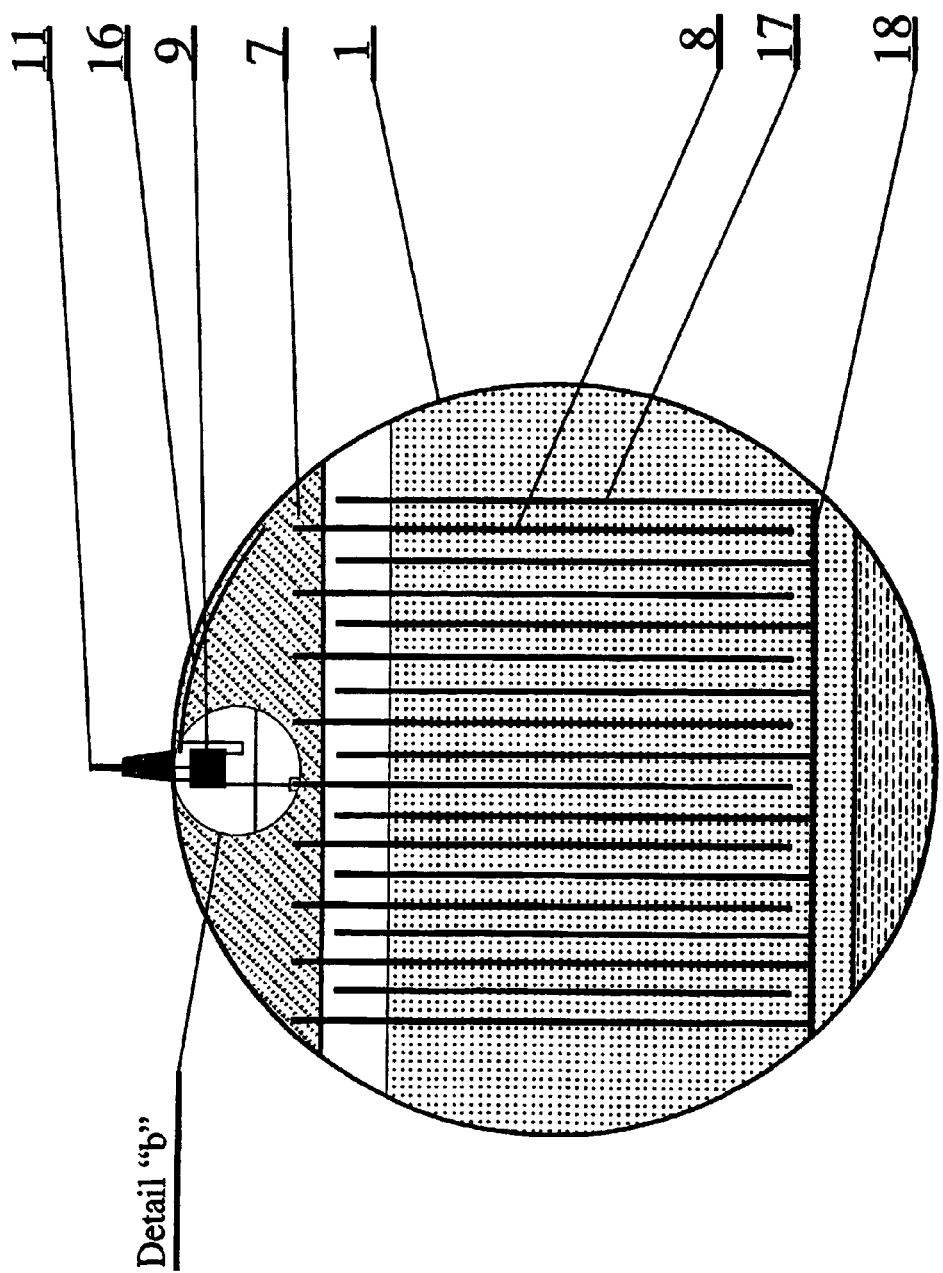
Figure 5:
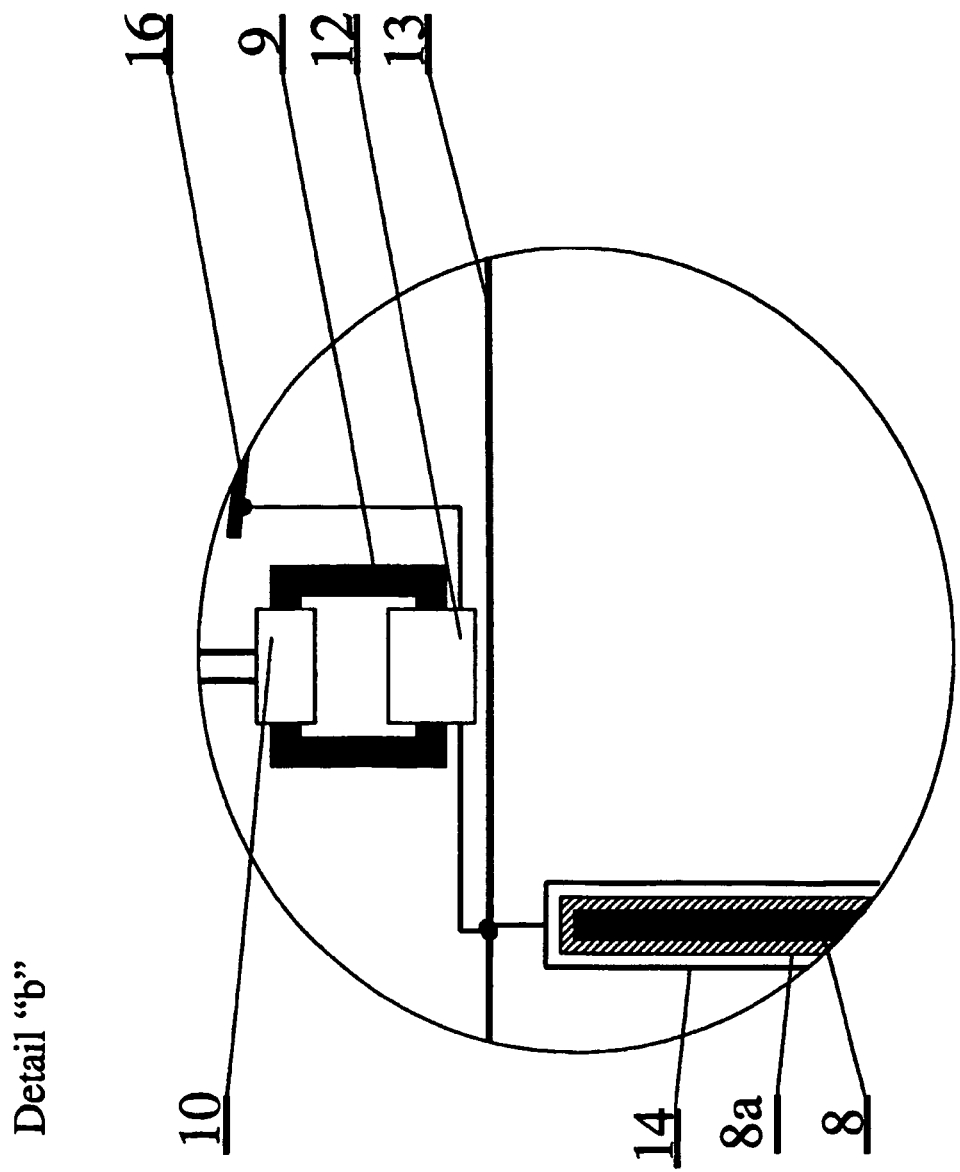

In a second embodiment of the invention, as shown in FIGS. 4 and 5, a system or set of electrodes is fixed in the conducting elements 14 in the frame 7, which are supplied with high voltage of the sane sign. One end of the high voltage winding 12 is connected, through a busbar 13 and the conducting element 14, with conducting plates 8 or with conducting plates with an insulating layer 8a, while the second end is connected to a coupling element 16, located inside the frame 7, in close proximity of the vessel wall, so that the capacitance between the coupling element 16 and the wall of the vessel 1 is greater than the capacitance between each pair of the conducting plates 8 of the electrode system, formed by the conducting plate 8 or the conducting plate with the insulating layer 8a, and an earthing electrode 17. The earthing electrodes 17 in the form of substantially vertically arranged plates or sheets are located between the conducting plates 8 or supply electrodes and they are connected with the vessel wall through a connector 18, as for example schematically shown in FIG. 4.

In the first embodiment of the invention, as schematically shown in FIGS. 2 and 3, the electric field generated in the water-and-oil emulsion 2 between conducting plates 8 or conducting plates with an insulated layer 8a requires the plates to be power supplied from a source of AC voltage. Voltage is supplied to the conducting plates 8 or conducting plates with the insulated layer 8a in a contactless manner through a capacitive coupling in the following way. The plates 8 are placed in the grooves of the supporting frame 7. These plates can be all made of a conducting material or they can have a conducting core surrounded by the insulating layer 8a. The supporting frame 7 is a casting of an insulating material, inside which there are embedded conducting elements 14. which are located in the immediate proximity of the grooves with the plates 8. The conducting elements 14 are alternately connected to the ends of the high voltage secondary winding 12 of a feeding transformer 9 by means of busbars 13. The conducting elements 14 are coupled in a capacitive way with the conducting plates 8 or the conducting layers of the plates coated with the insulating layer 8a, which causes that voltage generated in the secondary winding 12 of the transformer 9 is supplied in a contactless way to the conducting plates 8, also in an alternating way. One end of the primary winding 10 of the feeding transformer 9 is connected to the vessel 1 casing, and the other end of the primary winding 10 is connected with a low voltage terminal 11. The operating frequency of the feeding transformer 9 is higher than 50 Hz, which allows a reduction of the size of the transformer 9.

In the second embodiment of the invention, as schematically shown in FIGS. 4 and 5, inside a vessel 1 there are placed two sets of an electrode system. In one set, each conducting plate 8, or conducting plate with an insulating layer 8a, is placed in the groove of a supporting frame 7. The supporting frame 7 is a casting of an insulating material. inside which there are embedded conducting elements 14, which are located in the immediate proximity of the grooves with the plates 8. The conducting elements 14 are connected with one end of the high voltage secondary winding 12 of a feeding transformer 9. by means of a bus bar 13. The conducting elements 14 are coupled in a capacitive way with the conductive plates 8, or the conductive layers of the plates enveloped in the insulating layer 8a, which causes that voltage generated in the secondary winding 12 of the transformer 9 is supplied in a contactless manner to the conducting plates 8. Between the plates 8 there are arranged metallic plates 17 of the second set of electrodes, which are connected with one another and with the vessel 1 casing through a connector 18. The other end of the secondary winding is connected with a coupling element 16 placed inside the supporting frame 7 in the Immediate vicinity of the vessel wall, thus ensuring a capacitive coupling with the vessel wall, whose potential is the reference potential. One end of the primary winding 10 of the feeding transformer 9 is connected to the casing of the vessel 1, while the second end of the primary winding 10 is connected with a low voltage terminal 11. The operating frequency of the feeding transformer 9 is higher than 50 Hz, which permits a reduction in the size of the transformer.

It should be realised that the above presentation of the invention has been made by way of example, and that alternative embodiments will be obvious for a person skilled in the art. However, the scope of protection claimed is defined in the patent claims supported by the description and the appended drawings.

LIST OF REFERENCE NUMBERS USED IN THE FIGURES

1. Vessel
2. Oil-and-water emulsion
3. Inlet
4. Baffle
5. Water drain
6. Water phase
7. Supporting fame
8. Conducting plates, 8a—conducting plates with an insulating layer
9. Feeding transformer
10. Low voltage winding
11. Low voltage terminal
12. High voltage winding
13. Voltage busbars
14. Conducting element
15. Oil drain
16. Coupling element
17. Earthing electrodes
18. Connector

The invention claimed is:

1. An electrostatic separator containing a vessel, inside which there is suspended a system of electrodes energised from an external voltage source, the electrode system comprising:
    at least one pair of conducting plates which is attached to a supporting frame arranged inside the vessel, and electrically connected with a high voltage winding of a feeding transformer, which is placed in the supporting frame.

2. The separator according to claim 1, wherein the supporting frame is a casting of an insulating material.

3. The separator according to claim 2, wherein the supporting frame casting is made of epoxy resin.

4. The separator according to claim 1, wherein the conducting plates of the electrode system are connected with the feeding transformer winding through a capacitive electrical connection.

5. The separator according to claim 4, wherein the capacitive electrical connection has a form of a conducting element, insulated within the supporting frame, and the end of the conducting plate of the electrode system is placed near the conducting element.

6. The separator according to claim 1, wherein the conducting plates of the electrode system are coated with a layer of an insulating material.

7. The separator according to claim 1, wherein the operating frequency of the feeding transformer is higher than 50 Hz.

8. The separator according to claim 1, wherein the electrode system comprises a plurality of said conducting plates, wherein said conducting plates are parallel.

9. The separator according to claim 1, wherein a first end of a low voltage winding of the transformer is operatively connected to a low voltage terminal external to the separator and a second end of the low voltage winding is connected to a wall of the vessel.

10. The separator according to claim 1, further comprising:
    conducting elements; and
    voltage busbars operative to connect ends of the high voltage winding of the transformer to said conducting elements.

11. The separator according to claim 10, wherein the conducting elements are arranged in insulating material forming part of the frame, wherein each of the conducting plates is arranged in a gap between the insulating material and each associated conducting element, and wherein the insulating material of the frame is arranged between each conducting element and each associated conducting plate.

12. The separator according to claim 10, wherein each of said conducting elements is capacitively coupled to an associated conducting plate.

13. The separator according to claim 1, wherein each conducting plate comprises conducting material coated with an insulating layer.

14. The separator according to claim 1, further comprising:
    conducting elements;
    a voltage busbar operative to connect a first end of a high voltage winding of the transformer to the conducting elements; and
    a coupling element arranged in the vicinity of a wall of the vessel, wherein a second end of the high voltage winding of the transformer being operatively connected to said coupling element.

15. The separator according to claim 14, wherein each of said conducting elements is capacitively coupled to its associated conducting plate.

16. The separator according to claim 1, wherein the electrode system comprises a plurality of said conducting plates, wherein said conducting plates are parallel, the separator further comprising:
    a plurality of earthing electrodes, wherein the conducting plates and earthing electrodes are alternatingly arranged.

17. The separator according to claim 16, further comprising:
    a connector operatively connecting the earthing electrodes to each other and to a wall of the vessel.

18. The separator according to claim 15, further comprising:
    an insulating layer arranged between each of the conducting elements and its associated conducting plate.

19. The separator according to claim 18, wherein the insulating layer comprises a portion of a wall of the vessel.

20. The separator according to claim 18, wherein the insulating layer comprises an insulating layer on each of the conducting plates.

21. The separator according to claim 1, wherein the separator comprises a plurality of said conducting plates, wherein adjacent said plates are supplied with high voltage of opposite sign.

* * * * *